(12) United States Patent
Green

(10) Patent No.: US 9,970,184 B2
(45) Date of Patent: May 15, 2018

(54) METHOD AND SYSTEM FOR RECYCLING DOMESTIC GREYWATER

(71) Applicant: Marrett Alexander Green, Vancouver (CA)

(72) Inventor: Marrett Alexander Green, Vancouver (CA)

(*) Notice: Subject to any disclaimer, the term of this patent is extended or adjusted under 35 U.S.C. 154(b) by 524 days.

(21) Appl. No.: 14/356,115

(22) PCT Filed: Nov. 14, 2012

(86) PCT No.: PCT/CA2012/050809
§ 371 (c)(1),
(2) Date: May 2, 2014

(87) PCT Pub. No.: WO2013/071433
PCT Pub. Date: May 23, 2013

(65) Prior Publication Data
US 2014/0299555 A1 Oct. 9, 2014

(30) Foreign Application Priority Data

Dec. 2, 2011 (CA) ..................................... 2759407

(51) Int. Cl.
| | |
|---|---|
| *E03C 1/12* | (2006.01) |
| *E03C 1/264* | (2006.01) |
| *E03C 1/24* | (2006.01) |
| *E03B 1/04* | (2006.01) |
| *C02F 1/00* | (2006.01) |
| C02F 1/32 | (2006.01) |
| C02F 1/76 | (2006.01) |
| C02F 1/78 | (2006.01) |
| C02F 103/00 | (2006.01) |

(52) U.S. Cl.
CPC ................. *E03C 1/12* (2013.01); *C02F 1/00* (2013.01); *C02F 1/003* (2013.01); *E03B 1/042* (2013.01); *E03B 1/044* (2013.01); *E03C 1/24* (2013.01); *E03C 1/264* (2013.01); *C02F 1/001* (2013.01); *C02F 1/008* (2013.01); *C02F 1/32* (2013.01); *C02F 1/76* (2013.01); *C02F 1/78* (2013.01); *C02F 2103/002* (2013.01); *C02F 2303/04* (2013.01); *E03B 2001/045* (2013.01); *Y10T 137/86035* (2015.04); *Y10T 137/86083* (2015.04)

(58) Field of Classification Search
None
See application file for complete search history.

(56) References Cited

U.S. PATENT DOCUMENTS

| | | | |
|---|---|---|---|
| 6,282,733 B1 * | 9/2001 | Gonzalez, Jr. ............ | E03B 1/04 210/153 |
| 7,913,331 B2 * | 3/2011 | Hartman ................... | E03B 1/04 4/665 |

* cited by examiner

*Primary Examiner* — Krishnan S Menon
*Assistant Examiner* — Ryan B Huang
(74) *Attorney, Agent, or Firm* — Ingenium Patents LLC; Peter R. Kramer

(57) ABSTRACT

The invention relates to a method and system for recycling domestic greywater. Greywater is drawn from a greywater waste pipe through an overflow pipe of a sanitary fixture, thereby, permitting greywater to be collected for reuse without the need for complicated and expensive retrofitting and/or reconfiguration of existing plumbing infrastructure. The system and method of the present invention can easily operate independently or be integrated with domestic utility systems to supply these utility systems with greywater.

11 Claims, 10 Drawing Sheets

METHOD AND SYSTEM FOR RECYCLING DOMESTIC GREYWATER

FIELD OF THE INVENTION

The present invention pertains to the field of water conservation and more specifically, to a method and system for recycling domestic greywater.

BACKGROUND OF THE INVENTION

Water is considered a renewable resource, however, pressures on the resource are growing with increased demands on usage. As the readily available supplies of fresh water are being used up, the importance of water conservation increases. Efforts to conserve water have extended to domestic household use, with much of the focus being on greywater which currently contributes 75% of total wastewater flow to domestic sewers.

Greywater recycling is one method of water conservation. Greywater is waste water that has the potential for reuse. To be considered greywater there must be no human/organic waste (feces) or toxic chemicals. Such sources would include water from normal sink use and shower/bathtub use, or at times used wash water from clothes or dish washing units. This partially used water can be recycled for irrigation or used to flush toilets. With partial filtration, or even with no treatment, greywater can be a valuable and reusable resource.

Various systems have been developed for recycling domestic greywater. U.S. Pat. No. 7,913,331 describes an integrated system for collecting and diverting rainwater and greywater for toilet flushing. The described system requires retrofitting of existing plumbing infrastructure and/or fixtures in order to integrate the system into the existing plumbing system of a home and further comprises numerous large and complicated components for its operation. In one example, U.S. Pat. No. 7,913,331 describes a portable and easy to install version of the system, however, even this version requires retrofitting of the existing plumbing system and/or sanitary fixtures in order to be operational.

There continues to be a need for methods and systems for recycling greywater that do not require complicated and expensive retrofitting of the existing plumbing system and that are adaptable for use with greywater utility systems currently available on the market.

This background information is provided for the purpose of making known information believed by the applicant to be of possible relevance to the present invention. No admission is necessarily intended, nor should be construed, that any of the preceding information constitutes prior art against the present invention.

SUMMARY OF THE INVENTION

An object of the present invention is to provide a method and apparatus (the apparatus also referred to as a system) system for recycling domestic greywater. In accordance with an aspect of the present invention, there is provided a method for recycling domestic greywater, the method comprising: drawing greywater from a greywater waste pipe, directing the drawn greywater in a countercurrent direction through an overflow pipe of a first sanitary fixture, and discharging the greywater into a second sanitary fixture or a greywater storage tank.

In accordance with another aspect of the invention, there is provided [[a]] an apparatus for recycling domestic greywater, the apparatus comprising: a countercurrent greywater collector conduit having a greywater inlet end and a greywater discharge end, the inlet end being adapted for insertion through an overflow pipe of a first sanitary fixture and the discharge end being adapted for connection to a pump, wherein insertion through the overflow pipe allows greywater to be drawn from a greywater waste pipe that is in fluid communication with the overflow pipe; when the pump is activated, the greywater flows through the greywater collector conduit in a direction counter to the normal flow of greywater within the overflow pipe; wherein the greywater drawn through the overflow pipe may be discharged into a second sanitary fixture or into a greywater storage tank. The apparatus may also include a retainer for retaining the greywater collector conduit in position within the overflow pipe. All references to a "greywater collector conduit" in this document are directed to and imply a countercurrent greywater collector conduit.

In accordance with another aspect of the invention, there is provided a kit for recycling domestic greywater, the kit comprising: the system according to the invention; and instructions for using the system.

BRIEF DESCRIPTION OF THE FIGURES

These and other features of the invention will become more apparent in the following detailed description in which reference is made to the appended drawings.

DETAILED DESCRIPTION OF THE INVENTION

Definitions

The term "greywater", as used herein, refers to wastewater generated from domestic activities, which can be recycled on-site for domestic reuse. Greywater, as used herein, may or may not require treatment for domestic reuse.

The term "sanitary fixture", as used herein refers to receptacles that are attached to the interior systems of water pipes and sewerage systems. Sanitary fixtures include, for example, bathtubs, washstands, sinks, toilets, and urinals of various types.

The term "greywater storage tank", as used herein refers to a storage tank of various shapes and sizes that is configured to hold greywater.

The term "domestic utility system", as used herein refers to an integrated system for distributing greywater from multiple sources within a domicile, for example, for distribution on demand to at least one application. For example, the greywater can be distributed to at least one toilet tank for flushing the toilet.

Unless defined otherwise, all technical and scientific terms used herein have the same meaning as commonly understood by one of ordinary skill in the art to which this invention belongs.

The method, according to embodiments of the present invention, comprises drawing greywater from a greywater waste pipe through an overflow pipe of a sanitary fixture, thereby, permitting greywater to be collected for reuse without the need for complicated and expensive retrofitting and/or reconfiguration of existing plumbing infrastructure. Furthermore, the method can easily be integrated with domestic utility systems to supply these utility systems with greywater.

The systems and apparatuses, according to embodiments of the present invention, require a minimal number of inexpensive components that are easy to assemble and install in existing plumbing infrastructure, thereby avoiding the need for retrofitting and/or reconfiguring existing plumbing which can otherwise be complicated, expensive, and oftentimes requiring expertise.

Method for Recycling Domestic Greywater

Figure 1:
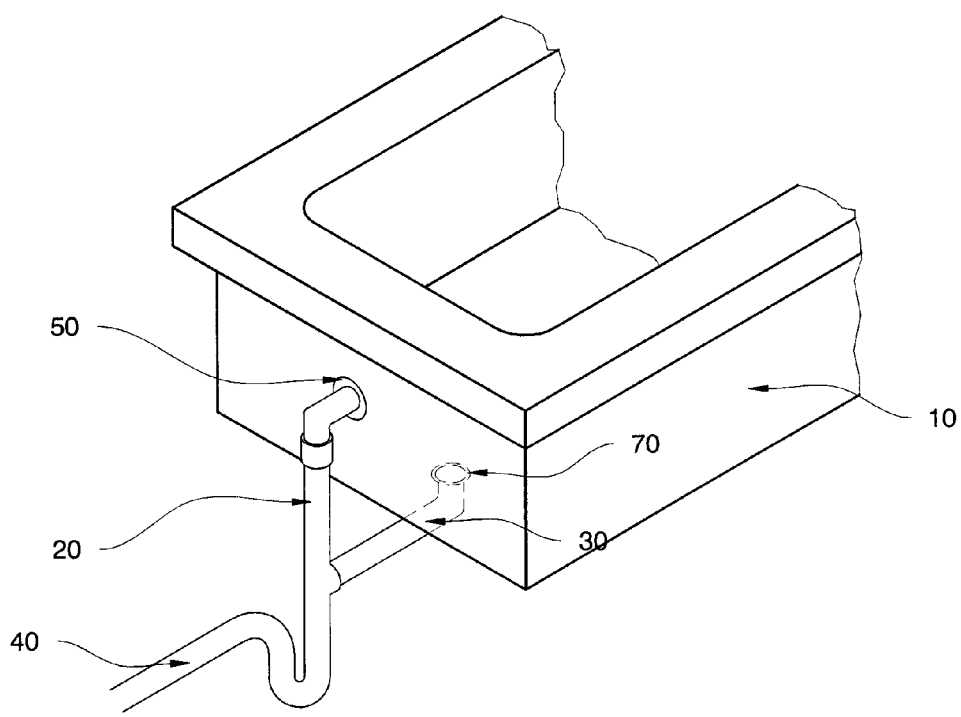
FIG. 1 is a schematic of a bathtub overflow and drainage system with which the apparatus for recycling greywater can be used, according to embodiments of the present invention.
Figure 3:
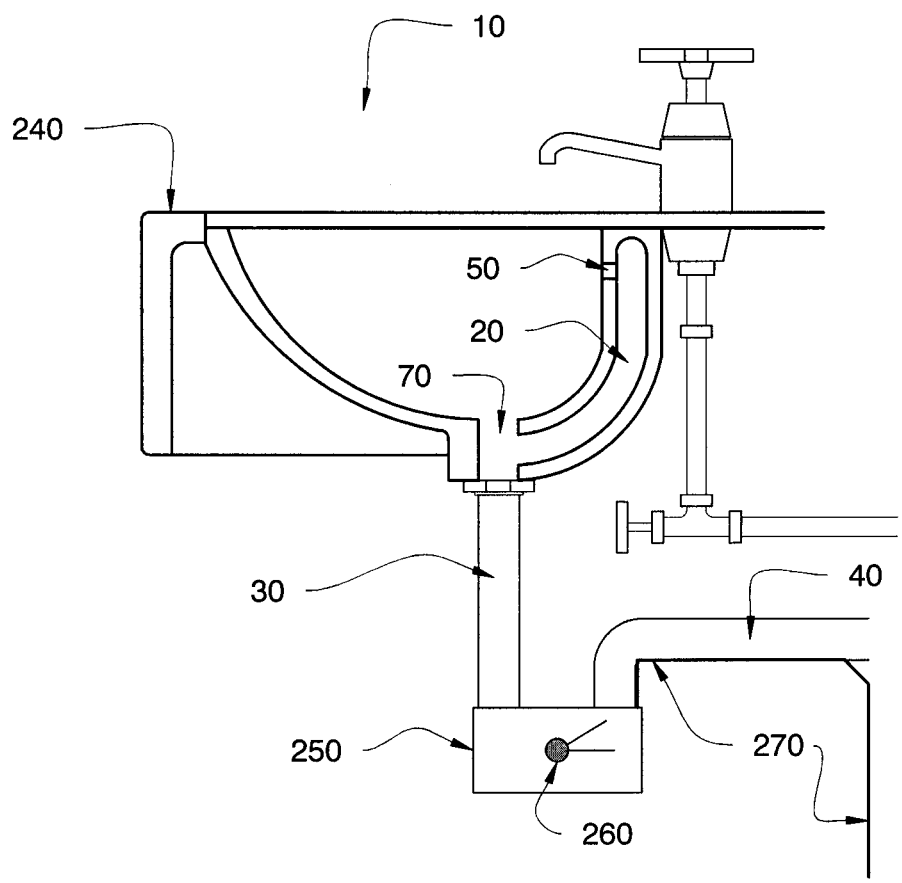
FIG. 3 is a cross-sectional view of a sink drain system with which the apparatus for recycling greywater can be used, according to embodiments of the present invention.

Referring to the drawings, in which like reference numerals identify identical or substantially similar parts throughout the several views, the present invention can be best understood by starting with a diagram of a standard overflow and drainage system commonly found in most plumbing infrastructures. As shown in FIG. 1, a standard bathroom plumbing system 10 comprises an overflow pipe and greywater waste pipe 40 through which greywater from a bathtub, for example, eventually passes to the sewer system. There are typically two access openings to the greywater waste pipe 40, the drain opening 70 and the overflow opening 50. Greywater can flow through these respective openings 70 and 50 by way of conduits that are each fluidly connected to the greywater waste pipe 40. These conduits are the drain pipe and the overflow pipe 20, respectively. Similar drain systems can be found with other sanitary fixtures. For example, FIG. 3 illustrates a similar drain system 10 found with a sink. The sink drain system 10 comprises an overflow opening 50 fluidly connected to the greywater waste pipe 40 by way of an overflow conduit 20. The drain opening 70 is fluidly connected to the greywater waste pipe 40 by way of the drain pipe 30.

Figure 2:
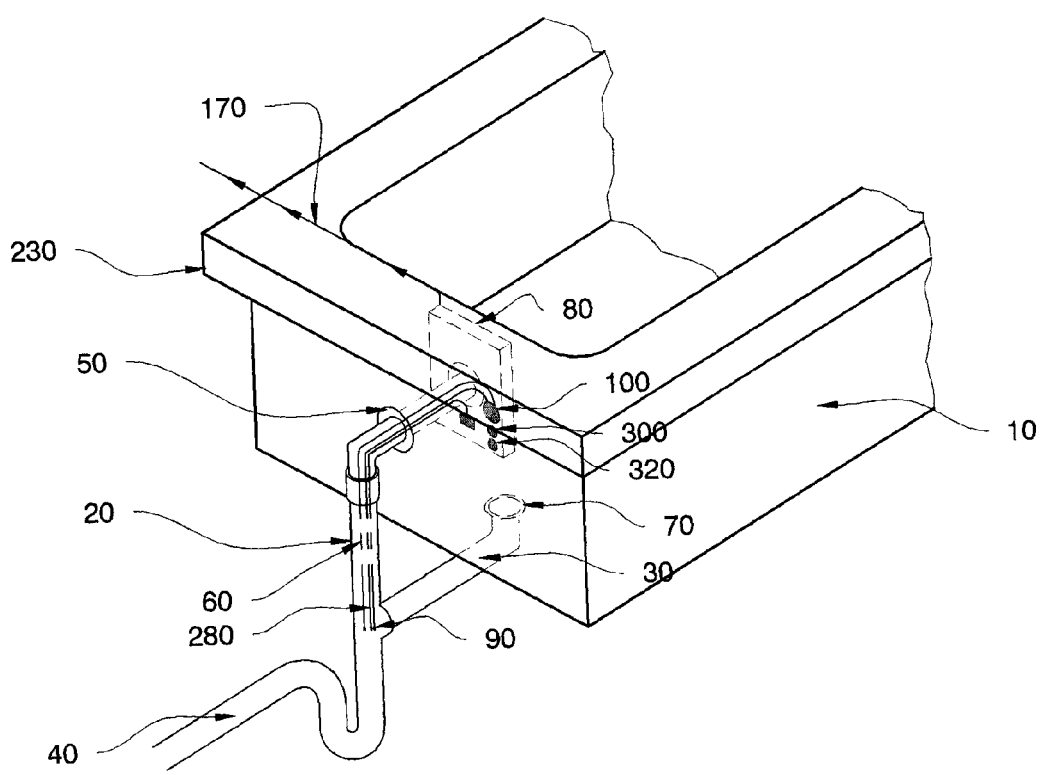
FIG. 2 is a perspective view of an embodiment of the apparatus for recycling greywater installed in the bathtub overflow and drainage system of FIG. 1, according to the present invention.

As illustrated in FIG. 2, the method, according to embodiments of the present invention, comprises drawing greywater from the greywater waste pipe 40 through the overflow pipe 20 of the sanitary fixture wherein the drawn greywater is directed through a countercurrent greywater collector conduit 60 positioned within the overflow pipe. While FIG. 2 shows the apparatus 80 installed on a bathtub 230, it will be apparent to those skilled in the art that the methods, systems and apparatuses of the present invention can be installed on other sanitary fixtures 30 that comprise similar drain systems 10, for example a sink.

The greywater is drawn through a countercurrent greywater collector conduit 60 disposed through the overflow opening 50. In one embodiment, the greywater collector conduit 60 is connected to the suction conduit of a pump 100 which provides intake suction to draw up the greywater through the overflow pipe/conduit 20 located above the greywater waste pipe 40. The intake greywater is then discharged from the discharge conduit 170 of the pump 100 into a second sanitary fixture, for example a toilet tank, or a greywater storage tank to be reserved and used as necessary. In this way, the greywater is collected through an existing overflow pipe/conduit 20 without the need for retrofitting and/or reconfiguration of the existing plumbing infrastructure. The greywater collected in this way can then be recycled for domestic use.

Figure 5:
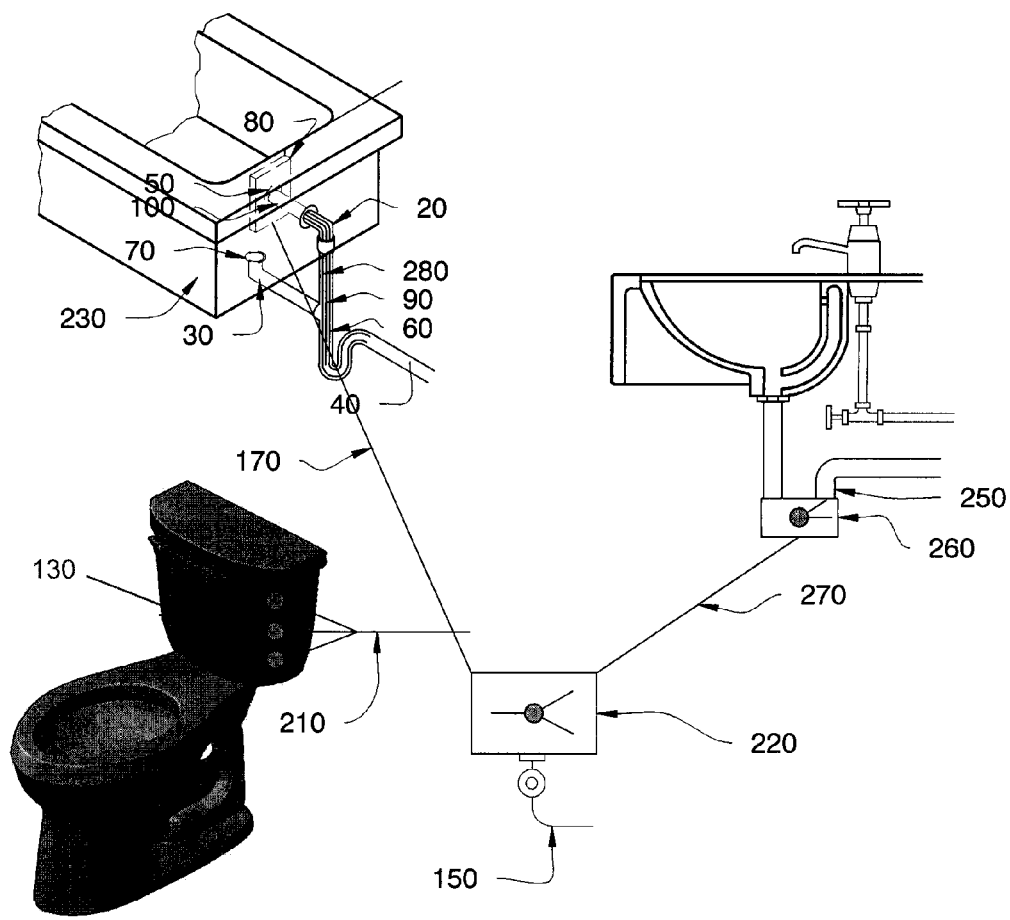
FIG. 5 is a schematic of a system including a countercurrent greywater collecting conduit installed in a typical household plumbing configuration wherein the greywater is discharged to a toilet tank, according to embodiments of the present invention.
Figure 6:
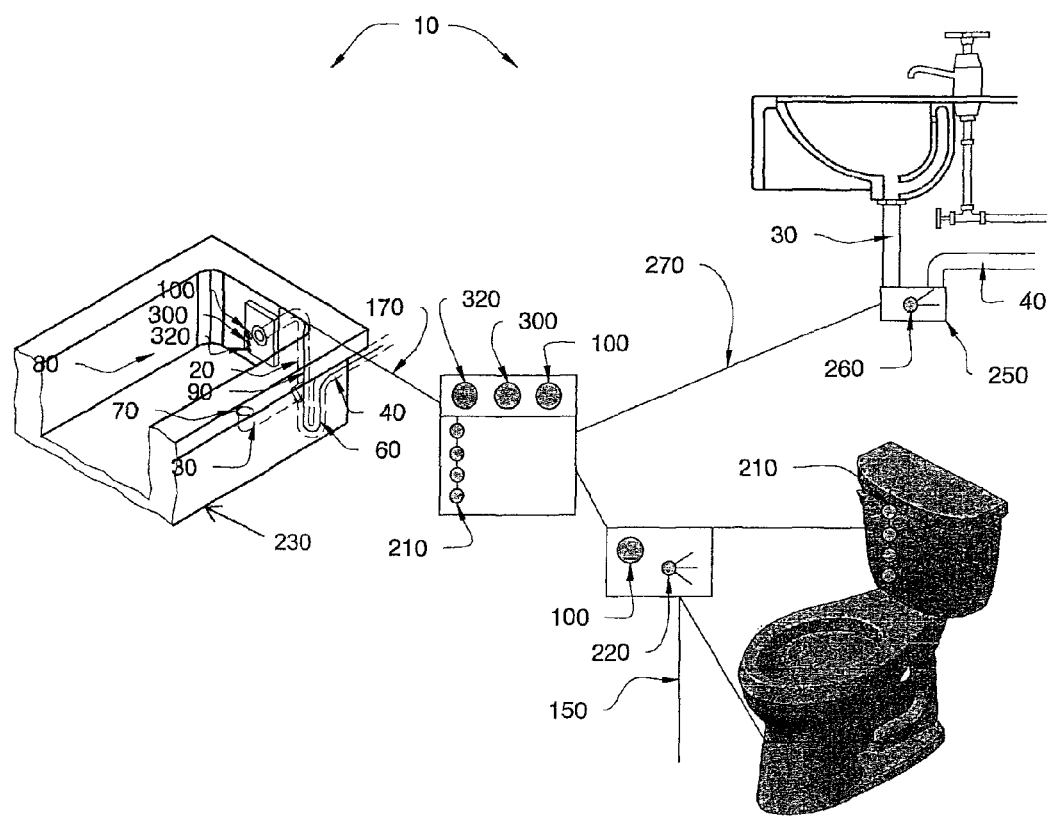
FIG. 6 is a schematic of a system including a countercurrent greywater collecting conduit for recycling greywater wherein the greywater is discharged to a storage tank, according to embodiments of the present invention.

In one embodiment, the collected greywater is discharged directly into a toilet tank for flushing the toilet (FIG. 5). In another embodiment, the collected greywater is discharged into a greywater storage tank and reserved for domestic use, for example irrigation or toilet flushing, as needed (FIG. 6). In a further embodiment, the greywater storage tank is integrated with a domestic utility system for distributing greywater from multiple sources and for multiple uses.

System for Recycling Domestic Greywater

Figure 7:
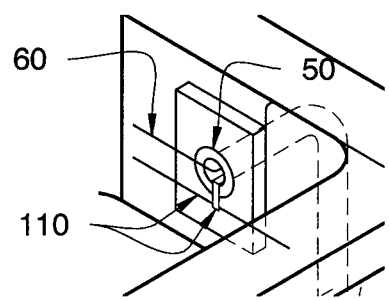
FIGS. 7(a) and (b) are perspective views of an apparatus for recycling greywater partially installed in an overflow pipe, according to embodiments of the present invention.
Figure 7:
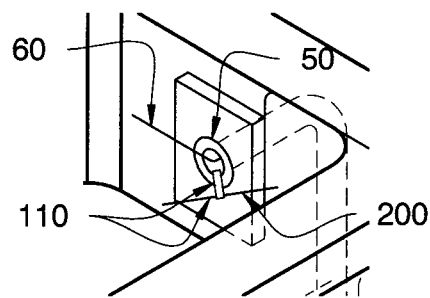
Figure 8:
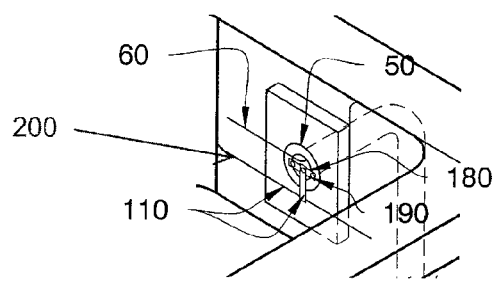
FIGS. 8(a) and (b) are perspective views of an apparatus for recycling greywater partially installed in an overflow pipe, according to embodiments of the present invention.
Figure 8:
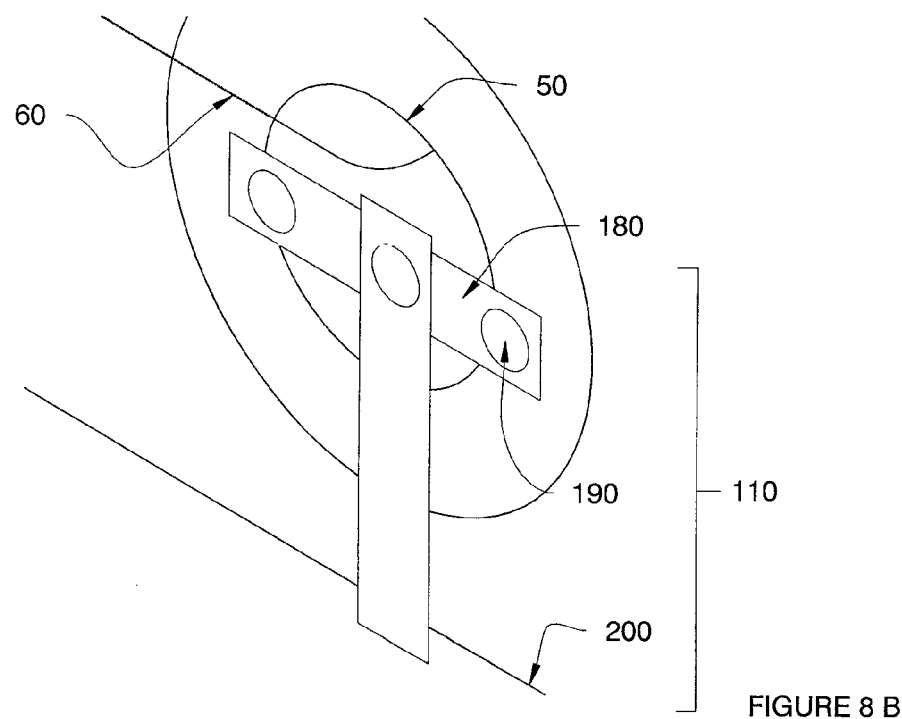

Referring to FIGS. 7 and 8, the systems and apparatuses according to embodiments of the present invention comprises a countercurrent greywater collector conduit 60 that is sized to fit through an overflow opening 50 of a sanitary fixture. In one embodiment, the greywater collector conduit 60 is sized to fit through the overflow opening 50 of a bathtub. In other embodiments, as shown in FIG. 3, the greywater collector conduit 60 is sized to fit through the overflow opening 50 of a sink. The greywater collector conduit 60 is of sufficient length and shape for disposal through the overflow opening 50 and the overflow pipe and/or conduit 20 to retrieve the greywater before it enters the city waste water system. Plumbing infrastructure may vary in shape and dimension. Accordingly, the greywater collector conduit 60 is sufficiently flexible to allow it to accommodate varying plumbing infrastructures. The greywater collector conduit 60 can be made from any number of materials that provide both flexibility and durability. For example, without limiting the foregoing, the greywater collector conduit 60 can be made from nylon, polyurethane, polyethylene, PVC, synthetic or natural rubbers, or any combination.

As shown in FIG. 2, the inlet end of the countercurrent greywater collector conduit 60 is adapted for insertion through the overflow pipe 20 and the discharge end of the countercurrent greywater collector conduit 60 is adapted for connection to the suction conduit of a pump 100. In this way, greywater can be collected via the overflow pipe at the juncture of the greywater waste pipe 40 before entering the building waste water system and is discharged through the discharge conduit of the pump 100 directly into a toilet tank 130 (FIG. 5) or to a greywater storage tank 120 (FIG. 6).

In some embodiments, discharge of the greywater is controlled by a selector smart valve 220. Referring to FIG. 5, the selector smart valve 220 is in fluid communication with the discharge conduit 170 and is configured to regulate discharge of the greywater. In some embodiments, the selector smart valve 220 may be fluidly connected to more than one water source and be configured to coordinate the discharge of water from these sources on demand or as water is available. For example, as shown in FIG. 5, the selector smart valve 220 is in fluid communication with the discharge conduit 170, a sink greywater conduit 270, and a city water supply line 150. In this way, greywater from either the bathtub 230 or the sink can be used to supply the toilet tank 130 when sufficient greywater is available, or fresh city water can be supplied to supplement the water needed to supply the toilet tank 130 when greywater is insufficient. In further embodiments, the selector smart valve 220 comprises a manual override button that can be pressed at any time to allow city fresh water to fill the toilet tank regardless of the treated greywater supply.

The pump 100 can be configured to include controlling means to control activation of the pump 100 when greywater is available through the overflow waste pipe. Referring to FIG. 2, for example, the pump 100 can include one or more sensors 90 for sensing fluid and/or pressure in the overflow pipe where it connects to the greywater waste pipe 40 so that the pump 100 starts and activates drawing greywater through the greywater collector conduit 60 only when sufficient greywater levels are detected.

In other embodiments (FIG. 5), controlling means of the pump 100 can be configured to cooperatively communicate with corresponding sensors 210 that detect fluid availability and/or levels in the greywater storage tank or toilet tank 130 in order to further coordinate the activation and discharge of greywater.

In some embodiments, the system 80 is controlled by way of a programmable controller powered by a power source, for example, a water turbine AC/DC recharger 280, which source powers the pump 100 as well. In some embodiments, the pump 100 is part of a domestic utility system. In this way, the system of the present invention can operate independently or be easily integrated into larger domestic utility systems.

The location of the pump 100 relative to the overflow opening 50 can vary as the system 80 can be adapted to accommodate a variety of pump 100 locations. For example, as shown in FIG. 2, the pump 100 is positioned at the bathtub overflow opening 50 or, in other embodiments, the pump 100 is disposed separate and away from the overflow opening 50. In embodiments where the pump 100 is disposed away from the overflow opening 50, the length of the greywater collector conduit 60 is adjusted to accommodate such distances. In this way, the system of the present invention is versatile and can be easily integrated into a variety of domestic utility systems.

In some embodiments, the system of the present invention further comprises a retainer 110 for positioning the greywater collector conduit 60 within the overflow pipe and/or conduit 20 through the overflow opening 50. A retainer 110 according to one embodiment of the present invention is shown in FIGS. 7(a) and (b) to comprise a hook-like attachment configured to overhang the lip of the overflow opening 50 and sized to wedge or hold the greywater collector conduit 60 into position within the overflow opening 50. In other embodiments (FIGS. 8(a) and (b)), the retainer 110 is more permanently fixed to the overflow opening 50 by utilizing the existing coverplate mounting bracket and screws 190. As shown in this embodiment, a t-bar 180 is fixed in place using the existing coverplate screws 190 such that the t-bar 180 holds the greywater collector conduit 60 into position within the overflow opening 50. The retainer 110 can further be adapted to include a system attachment means 200 to which the system 80, including for example the pump 100, in some embodiments, can be attached (FIGS. 8A AND 8B)

In other embodiments, alternative retaining means are contemplated for holding the system 80 in place overtop of the overflow opening 50. For example, suction cups, prongs for frictional security to a mounting bracket, as well as, but not limited to, a replacement bathtub overflow coverplate can be used. A new mounting bracket or coverplate can even be force-fitted into a circular sleeve on the overflow opening 50 with a snap on coverplate to hold the greywater collector conduit 60 inserted and positioned in place. In this way, installation of the system adapts to and utilizes the existing plumbing infrastructure, thereby, avoiding any retrofitting and/or reconfiguration of the existing infrastructure.

Depending on where the greywater is collected from, the collected greywater may need to be filtered to remove debris before it can be recycled for reuse. Accordingly, in some embodiments, the system of the present invention further comprises a filter assembly 300 to filter the greywater being drawn in through the inlet before the greywater is discharged. In other embodiments, the system further comprises a disinfection assembly 320. The disinfection assembly 320 can include, for example, chlorination, ozonation, or ultra violet light 320 to treat the greywater before discharging it to the storage tank or toilet tank. In some embodiments, the filtration assembly 300 and/or disinfection assembly 320 is located at the pump 100 within the system 80 mounted overtop of the overflow opening 50. In other embodiments, the filtration assembly 300 and/or disinfection assembly 320 is located at the storage tank 120.

Figure 4:
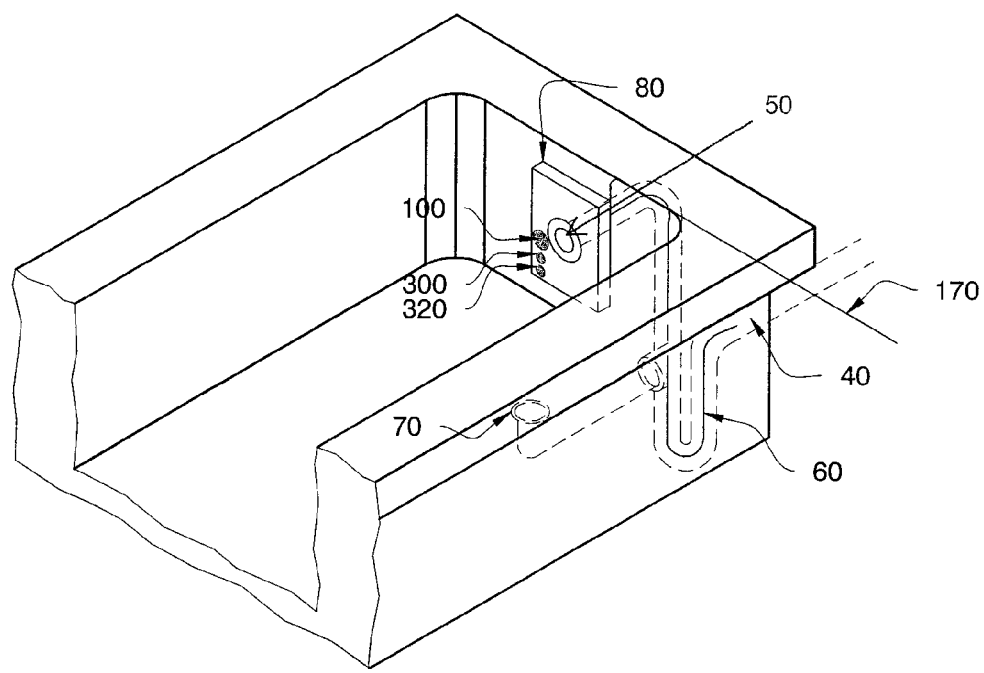
FIG. 4 is a schematic illustrating the installation of an apparatus for recycling greywater, according to embodiments of the present invention.

As shown in FIG. 4, installation of the system of the present invention is easy and does not necessarily require expert assistance as complicated retrofitting and/or reconfiguration of existing plumbing infrastructure is avoided. The inlet end of the greywater collector conduit 60 is disposed through the overflow opening 50 and fed through the overflow pipe and/or conduit 20 to access the greywater before the greywater exits the greywater waste pipe 40. The discharge end of the greywater collector conduit 60 is then connected to the suction conduit of a pump 100 to enable greywater to be drawn back before passing through the greywater waste pipe 40 and discharged directly to at least one toilet tank or to a greywater storage tank.

It will be apparent that systems of the present invention can be installed on more than one sanitary fixture and networked to permit greywater to be collected and recycled from more than one source. The greywater collected from these multiple sources, for example a sink and a bathtub, can be directly discharged to the same location. In some embodiments, the collected greywater can be discharged to at least one toilet tank or to at least one greywater storage tank or a combination of both.

Integration of Greywater Recycling System into Domestic Utility Systems

The system of the present invention is adaptable for integration into a variety of domestic utility systems as a means for supplying greywater for distribution by these larger systems. FIG. 6 illustrates one embodiment of a domestic utility system that can operate in cooperation with the system of the present invention. As shown, domestic utility systems can include a city water line 150 for supplementing greywater levels in the greywater storage tank 120 to ensure a sufficient water supply for distribution. In this embodiment, greywater collected using the system of the present invention is discharged into the storage tank 120 for distribution.

In other embodiments, as further illustrated in FIGS. 5 and 6, greywater can be collected from more than one sanitary fixture, a bathtub 230 using the system of the present invention and a sink 240. In the embodiment shown, the bathtub 230 has the system 80 of the present invention installed for recycling the greywater, the sink 240 has a U-joint 250 adapted with a valve 260 to redirect the greywater by a sink greywater conduit 270. The greywater from these two sources is discharged and/or redirected to the toilet tank 130 (FIG. 5) or to a treated greywater storage tank 120 (FIG. 6). In some embodiments, the treated greywater storage tank 120 comprises a pump for pumping greywater from the sink 240 to the storage tank 120.

Distribution of greywater can be controlled in these embodiments by a selector smart valve 220 which is activated to selectively distribute water from the treated greywater storage tank 120, bathtub 230, the sink 240, or a city water line 150. For example, activation of the selector smart valve 220 is triggered when sensors 210 in the toilet tank 130 sense that water levels are low. Activation of the selector smart valve 220 causes the valve 220 to open to allow water to enter the toilet tank 130 from the bathtub 230, the sink 240, the storage tank 120, or the city water line 150 depending on sufficiency of the detected greywater levels. As shown, each of the greywater sources is in communication with the selector smart valve 220 to provide a coordinated supply of water to the toilet tank 130. The selector smart valve 220 can optionally comprise a pump to actively pump water when activated. The system can be controlled by way of a programmable controller 210 that is either remotely controlled or hardwired.

Figure 9:
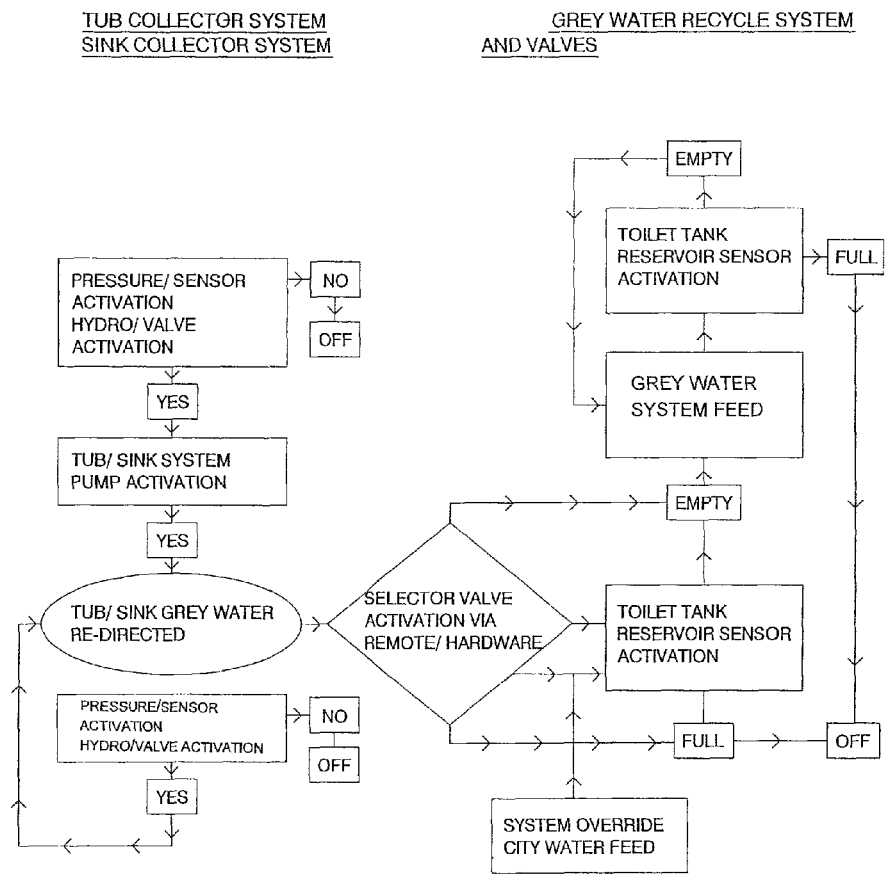
FIG. 9 is a flowchart illustrating one example of a feedback system for a system for recycling greywater, according to embodiments of the present invention.
Figure 10:
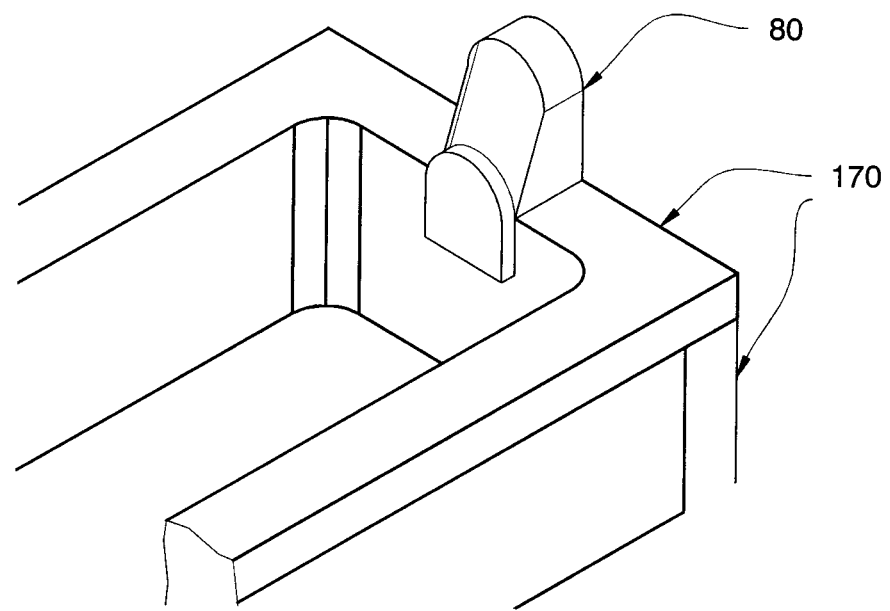
FIG. 10 is a perspective view of an apparatus for recycling greywater installed on a bathtub, according to embodiments of the present invention.

FIG. 9 further illustrates one embodiment of the feedback control system of the domestic utility system illustrated in FIGS. 5 and 6.

The disclosures of all patents, patent applications, publications and database entries referenced in this specification are hereby specifically incorporated by reference in their entirety to the same extent as if each such individual patent, patent application, publication and database entry were specifically and individually indicated to be incorporated by reference. Although the invention has been described with reference to certain specific embodiments, various modifications thereof will be apparent to those skilled in the art without departing from the spirit and scope of the invention. All such modifications as would be apparent to one skilled in the art are intended to be included within the scope of the following claims.

I claim:

1. An apparatus for recycling domestic greywater comprising:
    a countercurrent greywater collector conduit, a greywater drawing means, said countercurrent greywater collector conduit having a greywater inlet end and a greywater discharge end, the inlet end being adapted for insertion through an overflow pipe of a first sanitary fixture and the discharge end being adapted for connection to the greywater drawing means, said apparatus configured wherein insertion of said countercurrent greywater collector conduit through the overflow pipe allows greywater to be drawn from a greywater waste pipe; said countercurrent greywater collector conduit being in fluid communication with the overflow pipe; wherein when the greywater drawing means is operating, the greywater is drawn from said greywater waste pipe through said countercurrent greywater collector conduit and flows countercurrent to the normal efflux direction of overflow greywater; and
    a retainer for retaining the countercurrent greywater collector conduit in position within the overflow pipe;
    wherein the greywater drawn through said countercurrent greywater collector conduit is discharged into a second sanitary fixture or a greywater storage tank.

2. The apparatus according to claim 1, further comprising a pump, wherein the greywater drawing means is said pump, said pump having a suction conduit for connecting to the greywater discharge end of the countercurrent greywater collector conduit for greywater intake, and said pump having a discharge conduit for connecting to the second sanitary fixture or to a greywater storage tank.

3. The apparatus of claim 2, wherein the pump comprises one or more sensors configured to detect when there is greywater available to be drawn.

4. The apparatus of claim 1 further comprising wherein the retainer has an attachment means, with said attachment means configured to extend across apparatus 80.

5. The apparatus according to claim 2, further comprising, a filter/disinfection assembly in fluid communication with the countercurrent greywater collector conduit, wherein greywater passes through the filter/disinfection assembly before discharging into the second sanitary fixture or greywater storage tank.

6. The apparatus according to claim 4, further comprising, a filter/disinfection assembly in fluid communication with the countercurrent greywater collector conduit, wherein greywater passes through the filter/disinfection assembly before discharging into the second sanitary fixture or greywater storage tank.

7. The apparatus according to claim 6, further comprising, wherein the pump has one or more sensors configured to detect when there is greywater available to be drawn.

8. The apparatus according to claim 7 further comprising, a feedback control unit, said feedback control unit comprising a selector smart valve to selectively distribute water to the second sanitary fixture when said selector smart valve is activated by a sensor in the second sanitary fixture.

9. The apparatus of claim 3 further comprising wherein the retainer has an attachment means, with said attachment means configured to extend across apparatus 80.

10. The apparatus according to claim 3, further comprising, a filter/disinfection assembly in fluid communication with the countercurrent greywater collector conduit, wherein greywater passes through the filter/disinfection assembly before discharging into the second sanitary fixture or greywater storage tank.

11. The apparatus according to claim 3 further comprising, a feedback control unit, said feedback control unit comprising a selector smart valve to selectively distribute water to the second sanitary fixture when said selector smart valve is activated by a sensor in the second sanitary fixture.

* * * * *